April 3, 1934.  C. F. PRESCOTT  1,953,541
DISTRIBUTION VALVE FOR FLUID PRESSURE ENGINES
Filed Oct. 12, 1926  3 Sheets-Sheet 1

INVENTOR,
Charles F. Prescott.

April 3, 1934. C. F. PRESCOTT 1,953,541
DISTRIBUTION VALVE FOR FLUID PRESSURE ENGINES
Filed Oct. 12, 1926 3 Sheets-Sheet 2
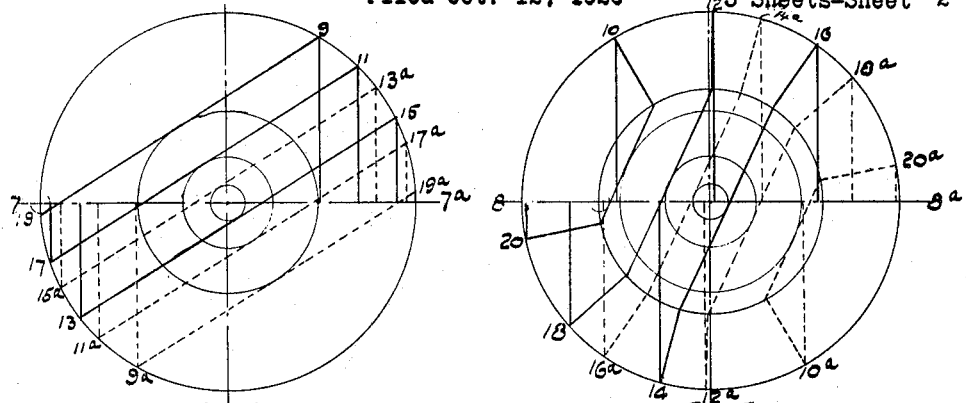
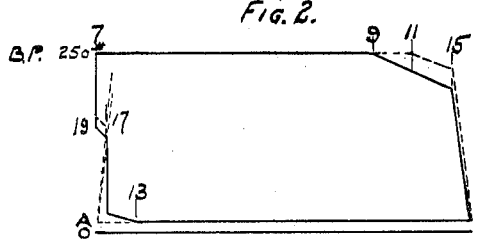
Fig.4.
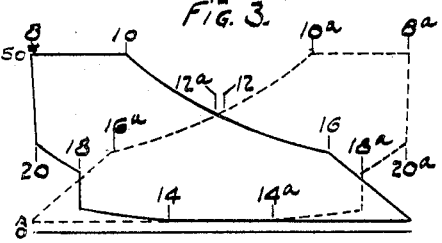
Fig.5.
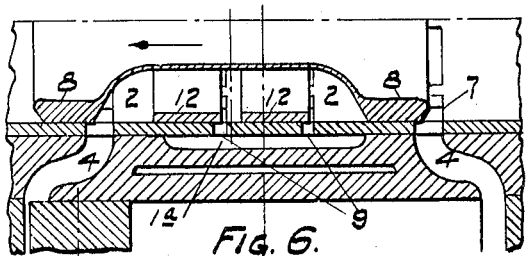
Fig.6.
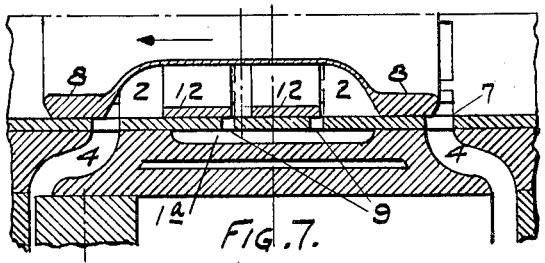
Fig.7.
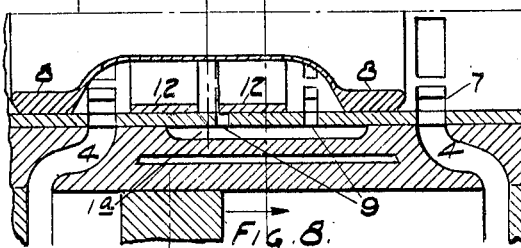
Fig.8.
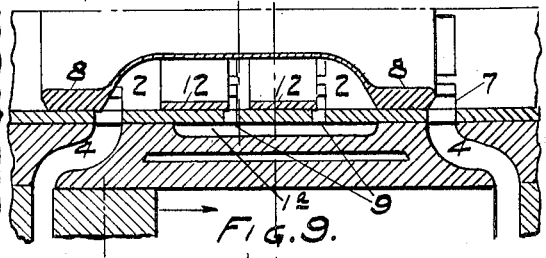
Fig.9.
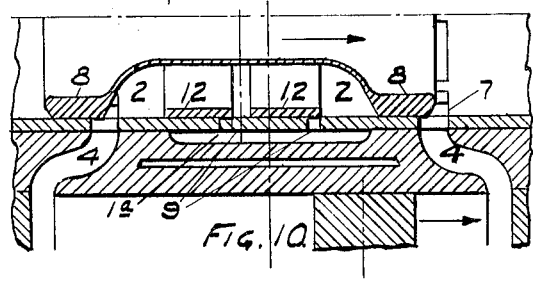
Fig.10.
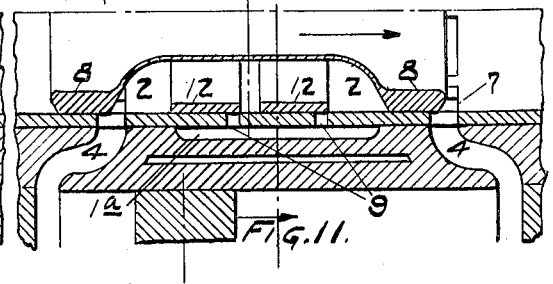
Fig.11.
INVENTOR,
Charles F. Prescott.

April 3, 1934. C. F. PRESCOTT 1,953,541
DISTRIBUTION VALVE FOR FLUID PRESSURE ENGINES
Filed Oct. 12, 1926 3 Sheets-Sheet 3
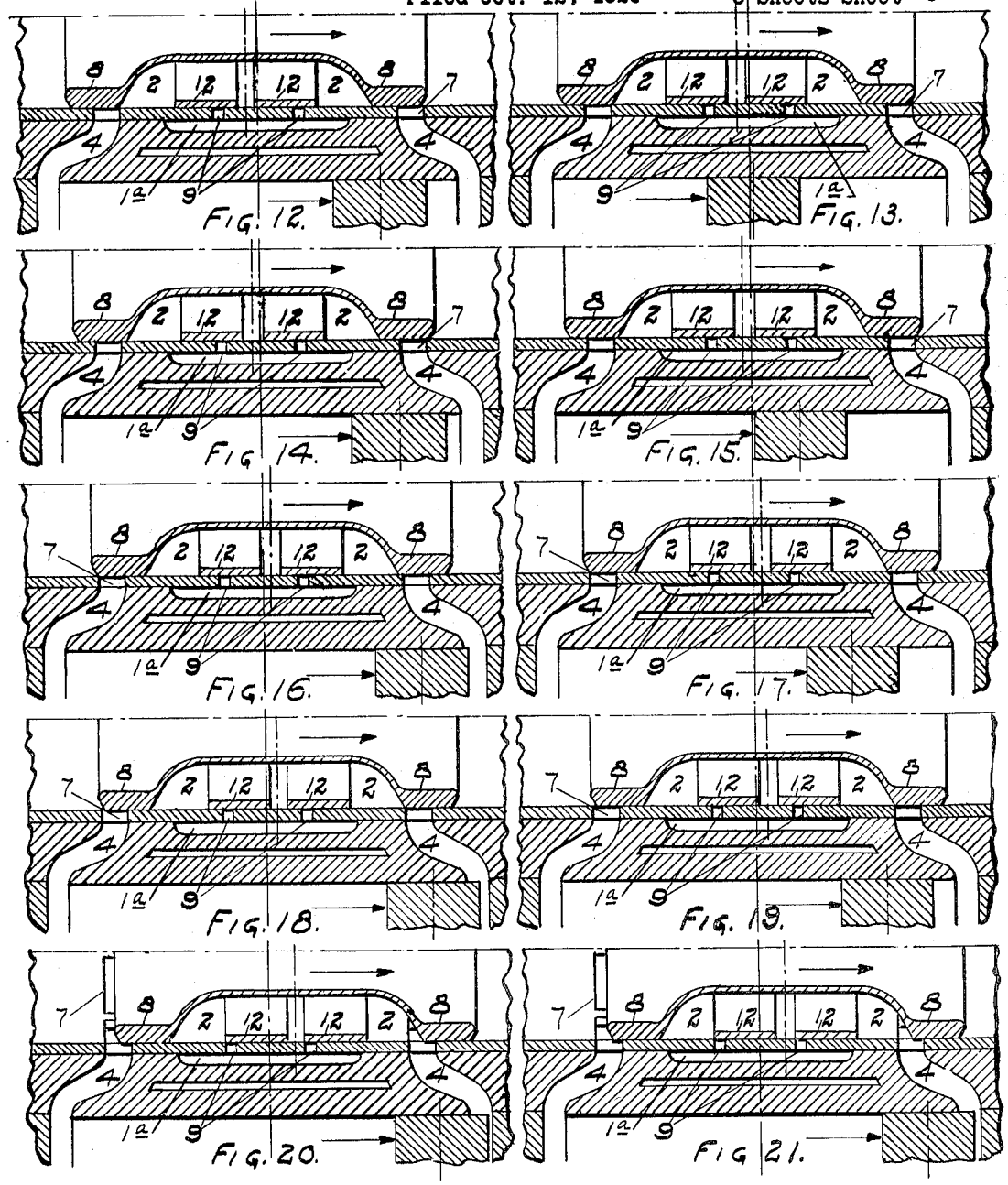
INVENTOR,
Charles F. Prescott Patented Apr. 3, 1934

1,953,541

UNITED STATES PATENT OFFICE 1,953,541

DISTRIBUTION VALVE FOR FLUID PRESSURE ENGINES

Charles F. Prescott, Brooklyn, N. Y.

Application October 12, 1926, Serial No. 141,173

6 Claims. (Cl. 121—142)

The objects of my invention are,

1st.—To provide means, whereby a relatively large volume, within the valve chamber, may be used alternately, as cylinder clearance volume and as steam storage space, without increase of the area of the steam inclosing walls or the weight of steam used, by the engine, per unit of power output, although the weight of steam in use, in the operating cycle of the engine, is largely increased, thereby.

2nd.—To decrease the mean pressure, adjacent to the initial end of the piston stroke, and subsequently, to produce an increase of mean pressure, toward the terminal end, of the piston stroke.

3rd.—To produce more uniform turning efforts, (torque), in the engine crank shaft, especially when the engine is employing early cut-off of live steam admission.

4th.—To reduce the effect, which in locomotive practice, is known as "imperceptible slip, of the driving wheels", which occurs at high speeds.

5th.—To limit the range of normal working cut-offs, so as to keep the range of expansion ratios, within limits, which are known to be more economical, in the use of steam. In doing this, I do not sacrifice the usual late cut-off, on locomotives, which is of great value, in starting and accelerating heavy loads, which I render available automatically, at times, when starting and under circumstances, at the will of the operator.

6th.—To secure the advantages, of multiple porting, for the admission, of steam, to the engine cylinder, without increase of the normal cylinder clearance volume, which would increase steam consumption and tend to neutralize the benefits of such multiple porting.

7th.—To control compression, in such manner, in an engine cylinder, that the terminal pressure, of compression, will be more nearly constant, throughout the range of expansion ratios, without material change, in the lengths, of the periods of compression, which lengths vary as usual, with the variations, of expansion ratios.

8th.—To increase the negative work, adjacent to the ends, of the piston strokes, so as to practically effect complete reversal, of the direction of pressures, in the engine bearings, before the admission of live steam, thus averting the occurrence of heavy shocks, due to admission, before such reversal, has been effected which, with usual steam distributions are very harmful to machinery especially when bearings are loose, either from wear or other reasons.

The volume, within the valve chamber, is never, in communication, with the engine cylinder, during the exhaust period, and never establishes communication between the ends, of the engine cylinder, so as to cause by-passing of steam, hence, its use to attain my objects, is not attended by added cost for steam used, per unit of power produced.

Fig. 1 is a vertical longitudinal section of a locomotive engine cylinder adapted and fitted to receive my distribution valves, which are shown; also a differential piston valve, with passages. The object of this is to make available, for starting heavy loads, a cut-off, which is later than the normal working cut-off; also a three way valve. The object of this is to make manually operable, the differential valve, so as to use the later cut-off, at the will of the operator, to prevent stalling.

Fig. 2 is a "Sweet" valve diagram showing valve events of my valves at the longest valve travel.

Fig. 4 is a theoretical indicator diagram constructed from the events given by Fig. 2.

Figs. 6, 8, 10, 12, 14, 16, 18 and 20 are diagrammatic sketches, showing valve and piston positions at the various events, as taken from Fig. 2.

Fig. 3 is a "Sweet" valve diagram with valve travel shortened.

Fig. 5 is a theoretical indicator diagram constructed from events given by Fig. 3.

Figs. 7, 9, 11, 13, 15, 17, 19 and 21 are diagrammatic sketches showing valve and piston positions as taken from Fig. 3.

Figure 1:
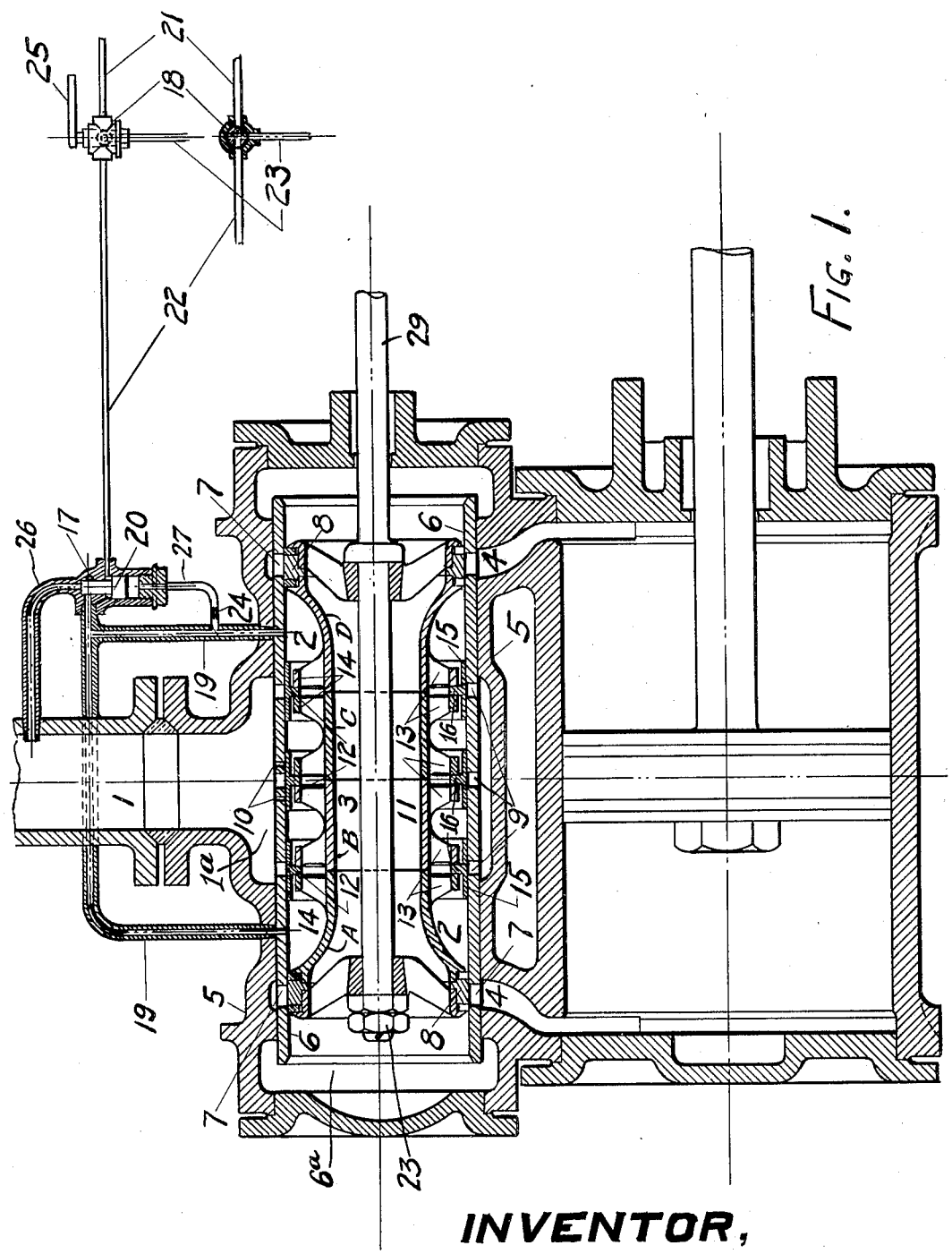

A more detailed description of my invention follows:

In Fig. 1 (1) is the live steam supply pipe, of the engine and its extension (1a) is the live steam chamber, of the engine cylinder. (2) is a relatively large volume, within the valve chamber (5) and separated from the exhaust chambers (6a) by the movable members, of the piston valve (11). (3) is the piston valve body, and (8) are the piston valve heads. (5) the valve chamber, is fitted with a bushing (6) to form its walls. The bushing (6) is fitted with ports (7) near its ends, communicating with the cylinder port passages (4) and ports (9) and (10) providing communication between the live steam chamber (1a) and the valve chamber (5). The piston valve body (3) is made sectional, divided transversely, into sections, A, B, C and D.

The end sections carry valve heads (8) and in addition, sections, of the valve body (3) are fitted with ribs (13) which carry ring followers (14) which slidably engage flanges (16) formed upon rings (15) the ensemble, forming sleeve valve heads (12). Slidable engagement is provided, to prevent rings (15) carrying the weight, of the piston valve, which would cause rings (15) to wear rapidly, resulting in leakage at valve heads (12).

Rings (15) are subject to live steam pressure, upon their outer peripheries, hence they must be uncut, to resist collapse, and valve body (3) must be sectional, to permit their insertion.

Rings (15) are of very light section, their weight to cause a bearing pressure, not in excess of five ounces, per square inch of projected area, and snugly fitted to slide, in bushing (6) to prevent leakage. It may be remarked, here that a small leak at valve heads (12) is not vital, as valve heads (8) control the exhaust, from the engine cylinder, as usual, so that a leak would only occasion a shorter than usual cut-off, of live steam, to do a given work. Valve heads (12) are co-ordinate and co-operative with ports (9) and (10) to form multiple admission valves, while valve heads (8) are co-ordinate and co-operative with the cylinder ports (7) to form cylinder valves.

The steam laps, of valve heads (12) over the main admission ports (9) are one and twenty one thirty seconds inches, and the steam laps, of valve heads (8) over the cylinder ports (7) are three-fourths inch, in the example illustrated. Movable valve members, are securely clamped, as a unit, by the nuts (28) upon the valve stem (29) to be driven, by a single valve operating mechanism, not shown. Ports (10) are very small and so located that steam laps, of one of valve heads (12) over them, are the same as the steam laps, of valve heads (8) over the cylinder ports (7). The function, of small ports (10) is to continue admission, of live steam, with a very limited flow, until closure of the cylinder ports (7) by the valve heads (8) effective at low speeds, only, as at high speeds, area of ports (10) is not sufficient, to supply an appreciable flow, of steam. This is to facilitate starting.

It is to be seen, that valve heads (12) have only two functions, namely; admission and cut-off, of live steam, whereas valve heads (8) have five functions, namely; establishment of communication, between the valve chamber and the engine cylinder, of a sufficient area, to pass the flow from the multiple admission ports, during live steam admission, to the engine cylinder; interruption of expansion of steam in volume (2) when the partially expanded steam is stored, for subsequent use, in the operating cycle; opening the cylinder ports for exhaust; closure of the cylinder ports for compression; and re-admission, of the stored steam during the compression period, for re-use in the next stroke, of the engine piston.

In Fig. 1, I illustrate, an automatic by-pass valve (17) and a three-way valve (18) to provide manual control, of valve (17). Valve (17) is used to by-pass a limited flow, of live steam, from the live steam supply pipe (1) directly to volume (2) through pipes (26) and (19). Either ports (10) or valve (17) or both, may be used on an engine, as both are means to facilitate starting and accelerating and to obviate stalling of the engine, in case of increased resistance of the load.

It is thought, that the use of both, is preferable, as either then provides a safeguard, against failure of the other.

To make clear, the following description, of the cycle of operation, of an engine, equipped with my "distribution valve", I have prepared, diagrammatic sketches, Figs. 2 to 21, inclusive, to which, I now refer.

Fig. 5 is a Sweet valve diagram, showing, events, of my distribution valve, as illustrated, in Fig. 1. In the construction of Fig. 2, the dimensions used were, as follows;

Crank circle and valve travel, seven inches.

Steam laps, valve heads (12) one and twenty-one thirty seconds inches.

Steam laps, valve heads (8) three-fourths inch.

Steam lead, valve heads (12) three sixteenths inch.

Re-admission lead, valve heads (8) one and nine thirty seconds inches.

Exhaust lap, valve heads (8) five sixteenths inch.

Exhaust lead, valve heads (8) one and seventeen thirty seconds inches.

To economize space, I have made Figs. 2 and 3, to scale of $\tfrac{1}{6}=1$.

Fig. 4 is a theoretical indicator diagram, with events numbered to correspond with the numerals, on the Sweet diagram, Fig. 2. This diagram shows a peculiar notch, in the compression curve, at point (17) which is due to the re-admission of the steam stored in volume (2) during the working stroke, of the engine piston. It also shows very clearly, the very considerable area, of negative work, under the compression curve and over the exhaust lines, which latter I have dotted in for the purpose of illustrating, reproducing same, from the right hand end of the diagram, from the left hand end of the engine cylinder. Complete diagram from the right hand end of the engine cylinder has been omitted to avoid confusion of lines. An area, such as this, is usually totally absent, in usual steam distributions, at the longest available valve travel. Full lines show work done, under normal operation, when speed is too high, for ports (10) to be effective and valve (17) is not by-passing. With ports (10) effective, or valve (17) by-passing, or both means active, the added work is shown, in dotted lines, at the upper right hand corner, while a slight loss, is shown, at the compression end, of the diagram, in like manner. This loss is due to the fact that, the re-admitted steam, from volume (2) is at the highest pressure, indicated.

Figs. 6, 8, 10, 12, 14, 16, 18 and 20 are diagrammatic sketches, showing valve and piston positions, when the various events occur, and the direction of movements, of valve and piston.

Fig. 6 shows the lead position, for live steam, of valve heads (12) also the lead position, for exhaust, of valve head (8). Valve head (8) has established a flow area through the engine cylinder port (7) and the piston is at the dead center position.

Fig. 8 shows the valves at the extreme travel position, at the left, and the piston is moving toward the right.

Fig. 10 shows the position, of valve heads (12) when live steam cut-off, or suppression of admission, has just been performed, and valve head (8) is maintaining communication, between volume (2) and the engine cylinder. Steam in volume (2) is starting to expand, with the steam, in the engine cylinder and the normal cylinder clearance volume, and will continue to so expand until interruption occurs, as is to be described, in Fig. 12.

During admission and this portion, of the expansion, volume (2) acts as cylinder clearance volume. Both valves and piston are moving toward the right.

In the following figures, both valves and piston are moving toward the right.

Fig. 12 shows the position, of valve heads (12) overlapping the live steam ports (9) and valve head (8) in position for closure, of communication, between volume (2) and the engine cylinder, interruption of expansion, of the steam, in volume (2) occurs and steam in volume (2) is stored, for re-admission, to the engine cylinder, during the succeeding working stroke, of the engine piston.

Fig. 14 shows the position, of valve head (8) for closure of the engine cylinder port (7) at the right hand end, of the engine cylinder, for compression.

Fig. 16 shows the position, of valve head (8) for opening of the engine cylinder port (7) at the left hand end, of the engine cylinder, for exhaust.

Fig. 18 shows the position, of valve head (8) for opening the engine cylinder port, at the right hand end, of the engine cylinder, for re-admission, to the engine cylinder, during compression, of the steam which was stored, removed from the working cycle by the valve action, described, in Fig. 12.

This is where the notch (17) is formed, in the compression curve, and compression from this point, until completion, is into the engine cylinder and the normal cylinder clearance volume, plus volume (2). This is where volume (2) first acts as cylinder clearance volume.

Fig. 20 shows the position, of valve heads (12) about to open the admission ports (9) for live steam admission, to the engine cylinder, just before the dead center position, of the piston is reached. This is the point, at which compression, is terminated, and it also completes the formation, of diagram, Fig. 4.

Fig. 3 is similar to Fig. 2, the difference being that valve travel, has been shortened, to effect cut-off, of live steam at twenty five per cent, of the stroke, of the engine piston.

Other dimensions, are the same as were used in the construction of Fig. 2.

Fig. 5 is a theoretical indicator diagram, with events numbered to correspond with the numerals, on the Sweet diagram, Fig. 3.

This diagram shows the same peculiar notch, in the compression curve, as in Fig. 4. However, as the stored steam, has been expanded, to a lower pressure, before being stored, it upon being re-admitted, does not produce so great a rise, in pressure, on the compression curve, and the re-admission occurs earlier, than in Fig. 4. These factors give the notch a slightly different appearance. On this diagram, is clearly shown, the lower mean pressure, at the early stage, of the working piston stroke, due to the height, of the compression curve, also the higher mean pressures toward mid-stroke, due to the expansion, of steam, in volume (2) with the steam, in the engine cylinder and the normal cylinder clearance volume. The large area of negative work, under the compression curve and over the exhaust line is clearly seen.

This area, is at least three times as large, as in usual steam distributions, and should have a marked effect upon quiet running of the engine. In this diagram, it is assumed that the piston speed, is too high, for ports (10) to be effective, hence there is nothing on the diagram to indicate their presence. Fig. 5, is interesting, in that it shows a considerably lower terminal of compression, at the short valve travel, than is shown, on the diagram, Fig. 4, for the longest available valve travel. From Fig. 5, it may be seen that the notched formation, of the compression curve, will not be liable to cause "jerkiness", in the engine, as the initial resistance of cushioning, is only that due to about seven pounds pressure, per square inch, of piston area. In practice, point, 12, owing to loss of admission pressure, from wire drawing through the ports, will be somewhat lower, and the exhaust line, at the point where it crosses the vertical, in the notch, will be very little changed, for, although the point of release (18) will be at lower pressure, the extreme end of the exhaust line will be higher, due to the presence of back pressure.

These effects will probably reduce the initial resistance to nil.

In these theoretical diagrams, back pressure, due to the atmosphere, only, is shown. The normal cylinder clearance, has been assumed to be nine per cent, of the piston displacement, while the space in volume (2) has been assumed to be fifteen per cent, of the piston displacement.

In figures odd numbered from 7 to 21, inclusive, the valve events and piston positions, as well as the direction of movements of the valves and piston, may be described similarly, to those, of figures even numbered from 6 to 20, inclusive, so that a detailed description, seems unnecessary, hence it is omitted. In reading these figures, it is only necessary, to keep in mind, that the piston positions, are changed, while the port openings are not so wide, all due to the earlier cut-off and shorter valve travel.

A description, of valve (17) and its manual control valve (18) and their functions, follows; valve (17) comprises, a casing (17) a differential piston (20) fitted in the casing (17) a pipe (26) to convey steam, from the live steam supply pipe (1) of the engine, to the small end of the differential piston (20) and pipes (19) to convey steam, from the upper end of casing (17) to the volume (2) in the engine valve chamber (5).

A pipe (27) fitted with a choke (24) of predetermined area, conveys steam, from one of the pipes (19) to the large end of the differential piston (20). Connected to the annular space above the large end, of the differential piston (20) is a pipe (22) extending to a three-way valve (18) and three-way valve (18) is conveniently located, for the operator. Pipe (21) conveys live steam, to the three-way valve (18) and exhaust from the three-way valve (18) is performed through pipe (23).

In the normal operation, of the engine, handle (25) of the three-way valve (18) is placed in position to shut off live steam and perform exhaust from the annular space in valve (17) through pipes (22) and (23). When the engine throttle valve is opened, live steam flows through pipe (26) to the small end of differential piston (20) forcing piston (20) downwardly to allow live steam to flow through pipes (19) to volume (2) in the engine valve chamber (5) and the engine will start, with the late cut-off, due to the shorter laps, of valve heads (8).

During the starting period, choke (24) feeds steam slowly to the large end of diffential piston (20) and when sufficient pressure is accumulated, it will cause piston (20) to rise, closing communication, between pipe (26) and pipes (19) after which action, cut-off will be performed, earlier, by reason of the longer laps, of valve heads (12). If acceleration, during the starting operation, has not been sufficient, the operator, moves handle (25) of the three-way valve, to the position, to close the exhaust pipe (23) and admit live steam to the annular space between the ends, of differential piston (20) thus establishing equilibrium, of pressures acting upon piston (20) which has no packing and is therefore, frictionless. Piston (20) will then drop, allowing live steam to flow to space (2) in the engine valve chamber (5) and the engine proceeds, again using the late cut-off, due to valve heads (8). After sufficient acceleration is gained, the operator, places the handle, of the three-way valve (18) in position to shut off admission of live steam, to the annular space in valve (17) and perform the exhaust, after which action, piston (20) will again rise, shutting off the supply of live steam to volume (2) when the engine, will be under the control of valve heads (12) with reference to live steam admission, to the engine cylinder. This feature is always available, for use when there is danger of stalling, due to an increase of resistance, in the lading, of the engine.

It will appear to those versed, in the art, that my manner of utilizing volume (2) within the engine valve chamber (5) results in a shifting of the higher mean pressures, toward the center of the piston stroke. This, especially in engines of more than one cylinder, coupled to a common crank shaft, results in a more uniform turning effort, in the engine crank shaft, as may be demonstrated by constructing, a torque diagram. The more uniform torque, will result in a means of reducing the great weight, necessary, in fly-wheels, at the present time and in the case of locomotives, where all fly-wheel action, is derived from the driving wheels, which in all cases do not furnish sufficient fly-wheel action, to produce great steadiness, the use of my system, of steam distribution, will produce a better riding machine, with somewhat lighter weights, in the driving wheels, acting to balance the reciprocating weights, horizontally. It will also be apparent, that I increase the area of negative work, to effect reversal of the direction, of pressures, in the engine bearings, before the admission of live steam, with no loss in power output, except at the latest cut-off, where the loss can be compensated for, by a very slight enlargement of the engine cylinder, if thought desirable. The large area of negative work, will produce, with all possible combinations of speed and power output, a very quiet running machine, due to the absence of shocks, caused by insufficient cushioning, before the admission of live steam. This will be true, even with loose bearings and will materially prolong the life of the machinery, between repair periods.

Improved torque, in combination with absence of shocks, will reduce the tendency to imperceptibly slip the driving wheels, of locomotives, at high speeds and be of great value, in starting heavy loads, when the tendency to slipping of driving wheels, is a very great drawback.

It is to be regretted, that in theoretical indicator diagrams, nothing can be done to show the great value, of multiple porting, for admission, of live steam. However, the value of this feature, has long been recognized and appreciated, by those practicing the art. However, it is usually accomplished, only at the expense, of increased cylinder clearance volume, which always increases the steam consumption, in an engine, and has not been extensively used, for that reason.

It would seem therefore, to be sufficient, to state that I accomplish multiple ported admission without an increase, of normal cylinder clearance volume.

The advantages, of limiting, the latest normal working cut-off are now so well appreciated, that I feel it to be sufficient, to state, that I accomplish this without sacrificing, the usual late cut-off, which is valuable, for maximum starting capacity.

That volume (2) acts at times, to enlarge the cylinder clearance volume, and at other times, as steam storage space, and that the stored steam is all re-used, without loss, due to being exhausted from or by by-passing, is apparent. It then follows, that the stored steam, is a constant quantity, without cost, for any given set, of working conditions; it adds no item, which might increase the steam consumption, of the engine, as it does not even require an increase, of the area, of the steam inclosing walls, which might increase heat loss to cylinder metal.

Volume (2) by reason of the fact that it is combined with those of the cylinder and its normal cylinder clearance volume, relatively late, in the process, of compression, acts very effectively, to arrest the rapid rise of pressure, during compression.

By reason of this very desirable effect, it is quite feasible to so manipulate, the factors, of cylinder design, as to get a lower percentage, of piston displacement, as cylinder clearance volume. The excess, thus removed from clearance volume, may then be utilized, to enlarge piston displacement, thus making a gain, in capacity, without increase, of cost for operation, or if piston displacement be unchanged, a direct volumetric saving will follow.

In Fig. 1, I show a very light design, of piston valve, which, when substituted for usual designs, has reduced weight 35% to 40%.

This design, is covered by United States Letters Patent, #1,634,339, granted, July 5th, 1927, and is now extensively used.

This special design of piston valve, when combined with the additional sleeve valve heads (12) will weigh less than most of the piston valves, now in use, so that no apprehension of bad effects, due to inertia action need be entertained, with existing valve gears.

It may readily be seen that, although I have followed locomotive practice to illustrate, my invention is adaptable to other types of engines such as, marine, stationary and portable and that whereas I show a combination of piston and sleeve valves other types of valves may be used without departure from the spirit of my invention, which covers multiple valves to admit to and cut-off from volume 2, the working fluid pressure; the use of volume 2, as cylinder clearance volume and steam storage space and valves controlling admission to the cylinder, of steam in volume 2, steam flowing through volume 2, and cut-off steam to the engine cylinder, and exhaust from the engine cylinder.

Having described my invention, I claim, as follows;

1. In a steam engine, a cylinder; a piston fitted to reciprocate, in said cylinder; a live steam pipe; a live steam chamber; a valve chamber; exhaust steam chambers; cylinder port passages; a valve assembly, comprising, a piston valve, with body divided, transversely, into sections; ribs, attached to said valve body sections; ring followers, attached to said ribs; multiple sleeve valve movable members; inwardly extending flanges, attached to said sleeve valve movable members; said ring followers, slidably engaging said inwardly extending flanges; a valve chamber bushing; said valve chamber bushing, extending across and between said cylinder port passages, and across said live steam chamber; multiple admission ports, in said valve chamber bushing, communicating with said live steam chamber; ports, in said valve chamber bushing, communicating with said cylinder port passages; said multiple sleeve valve movable members, co-ordinate and co-operative with said multiple admission ports, communicating with said live steam chamber; piston valve movable members, co-ordinate and co-operative with said ports, communicating with said cylinder port passages; multiple admission valves, comprising, said multiple sleeve valve movable members, and said multiple admission ports; cylinder valves, comprising, said piston valve movable members, and said ports communicating with said cylinder port passages; said piston valve movable members separating, said valve chamber from said exhaust steam chambers; steam laps, of said multiple admission valves substantially greater, than the steam laps, of said cylinder valves; a volume, within said valve chamber; said volume constituting a passage, of ample flow area, between said multiple admission valves and said cylinder valves; said volume, in communication with said cylinder, during the late compression period, the admission period, and the early expansion period; said volume, not in communication with said cylinder, during the late expansion period, the exhaust period and the early compression period; a valve stem; valve stem nuts; said valve assembly, clamped upon said valve stem, by said valve stem nuts, and adapted to be actuated by existing forms, of single valve gearing; means, automatically operable, to by-pass a small flow of live steam, around said multiple admission valves, to said cylinder valves, on admission, of live steam, to said live steam pipe; means, automatically operable, to suppress, said automatically operable, by-pass, after the lapse, of a pre-determined period, of time; means, manually operable, whereby said automatically operable means of by-passing may be caused to function at will; and means, to continue admission, with a small flow, of live steam, until closure, of said ports, communicating with said cylinder port passages, by said cylinder valves, has been effected.

2. In a steam engine, a live steam pipe; a valve chamber; an engine cylinder multiple admission valves between said pipe and valve chamber; cylinder valves between said valve chamber and engine cylinder; a differential piston valve, having a small end and a large end, on the differential piston, and an annular space, between said small end and said large end, of said differential piston valve; a passage, between said live steam pipe and said small end, of said differential piston valve; passages, between said small end, of said differential piston valve and said valve chamber; a passage, between said valve chamber, and said large end, of said differential piston valve; a choke, of pre-determined area, in said passage, between said valve chamber and said large end, of said differential piston valve; said differential piston valve, said passages and said choke, automatically co-operating, on admission, of live steam, to said live steam pipe, to by-pass, a small flow, of live steam around said multiple admission valves, to said cylinder valves, by the action, of live steam pressure, upon said small end, of said differential piston valve; said differential piston valve, said passages and said choke, co-operating automatically, to suppress, said by-pass after the lapse, of a pre-determined period, of time, by the action of steam pressure, from said valve chamber, through said passage and said choke, upon said large end, of said differential piston valve.

3. In a steam engine, a live steam pipe; a valve chamber; an engine cylinder multiple admission valves between said pipe and valve chamber; cylinder valves between said valve chamber and engine cylinder; a differential piston valve, having a small end and a large end, on the differential piston, and an annular space, between said small end and said large end, of said differential piston valve; a passage, between said live steam pipe and said small end, of said differential piston valve; passages, between said small end, of said differential piston valve and said valve chamber; a passage, between said valve chamber and said large end, of said differential piston valve; a choke, of pre-determined area, in said passage, between said valve chamber and said large end, of said differential piston valve; a three-way valve; a passage between the source, of live steam supply and said three-way valve; a passage, between said three-way valve and said annular space, between said small end and said large end, of said differential piston valve; a passage, between said three-way valve and the atmosphere; said differential piston valve, said passages, said choke and manual operation, of said three-way valve, co-operating, to by-pass, a small flow, of live steam, around said multiple admission valves, to said cylinder valves, by the action, of steam pressure, from said three-way valve, in said annular space, between said small end and said large end, of said differential piston valve; while live steam, is flowing through said live steam pipe; said differential piston valve, said passages, said choke and manual operation of said three-way valve, co-operating, to suppress, said manually operable by-pass, by the removal, of steam pressure, from said annular space, between said small end and said large end, of said differential piston valve, while pressure, from said valve chamber, is acting, through said passage and said choke, upon said large end, of said differential piston valve and steam flows through said live steam pipe.

4. In a steam engine, a live steam chamber; a valve chamber; a valve chamber bushing; multiple admission valves; multiple admission ports; cylinder valves; cylinder ports; small ports, in said valve chamber bushing, between said live steam chamber and said valve chamber; said small ports, so located, with relation to one of said multiple admission ports, that the steam laps, of one of said multiple admission valves, over said small ports, are equal, to the steam laps, of said cylinder valves, over said cylinder ports.

5. In a steam engine, means for multiple ported admission, a live steam chamber; a valve chamber; a valve chamber bushing; multiple admission ports; cylinder ports; cylinder port passages; multiple, movable sleeve valve members, co-ordinate and co-operative with said multiple admission ports; said multiple, movable sleeve valve members and said multiple admission ports, constituting, multiple admission valves; piston valve movable members; said piston valve movable members and said cylinder ports, constituting, cylinder valves; a valve stem; valve stem nuts; all movable valve members, clamped, as a unit, upon said valve stem, by said valve stem nuts; a valve assembly, adapted to be actuated, by usual forms, of single valve, gearing; steam laps, of said multiple admission valves, substantially greater, than the steam laps, of said cylinder valves; a volume, within said valve chamber, of ample cross sectional area, to pass the flow from said multiple admission valves, to said cylinder valves; ample area, of openings, through said cylinder valves, to pass the flow from said volume to said cylinder; said multiple admission valves, said volume, said cylinder ports and said cylinder valves, co-operating to constitute, multiple ported admission.

6. In a steam engine, of the reciprocating piston type, a live steam pipe; a live steam chamber; a valve chamber; exhaust steam chambers; multiple admission ports, between said live steam chamber and said valve chamber; multiple, movable valve members, co-ordinate and co-operative with said multiple admission ports; multiple admission valves, comprising said multiple admission ports and said multiple, movable valve members; a cylinder; ports, between said valve chamber and said cylinder, and between said cylinder and said exhaust chambers, located adjacent to the ends of said cylinder; movable valve members co-ordinate and co-operative with said ports, located adjacent to the ends of said cylinder; cylinder valves, comprising, said ports, adjacent to the ends of said cylinder and said movable valve members, co-ordinate and co-operative with said ports; said cylinder valves separating said valve chamber, from said exhaust steam chambers; a volume, of ample capacity, within said valve chamber; a passage, of ample cross-sectional area, through said volume, within said valve chamber, to carry flow, through said multiple admission valves to said cylinder valves; steam laps, of said multiple admission valves, substantially greater, than the steam laps, of said cylinder valves; said volume in communication with said cylinder, during the late portion, of the compression period, the admission period and the early portion of the expansion period; said volume not in communication, with said cylinder during the late portion of the expansion period, the exhaust period and the early portion of the compression period; small ports, adjacent to one of said multiple admission ports, so located that the steam laps, of one of said multiple admission valve, movable members, over said small ports, are equal to the steam laps of said cylinder valves; all movable valve members, operated, as a unit, by unit valve operating mechanism; means, automatically operable to by-pass a small flow, of live steam, around said multiple admission valves to said cylinder valves, on admission of steam to said live steam pipe; means, automatically operable to suppress, said automatically operable, by-pass, after the lapse of a suitable period, of time; means manually operable, whereby said automatically operable means of by-passing, may be caused to function at will.

CHARLES F. PRESCOTT.